US012368646B2

(12) United States Patent
Ingleby et al.

(10) Patent No.: US 12,368,646 B2
(45) Date of Patent: *Jul. 22, 2025

(54) ENHANCED DEVICE CLASSIFICATION INCLUDING CROWDSOURCED CLASSIFICATIONS FOR INCREASED ACCURACY

(71) Applicant: FORESCOUT TECHNOLOGIES, INC., San Jose, CA (US)

(72) Inventors: Erick Ingleby, San Francisco, CA (US); Nirmal F. Rajarathnam, Fremont, CA (US)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,329

(22) Filed: May 31, 2024

(65) Prior Publication Data
US 2024/0323093 A1   Sep. 26, 2024

Related U.S. Application Data

(63) Continuation of application No. 18/148,951, filed on Dec. 30, 2022, now Pat. No. 12,074,771.

(60) Provisional application No. 63/325,299, filed on Mar. 30, 2022.

(51) Int. Cl.
H04L 41/14 (2022.01)
G06N 5/022 (2023.01)

(52) U.S. Cl.
CPC ............ *H04L 41/14* (2013.01); *G06N 5/022* (2013.01)

(58) Field of Classification Search
CPC .......... G06N 5/022; H04L 41/14; H04L 41/16
See application file for complete search history.

(56) References Cited

U.S. PATENT DOCUMENTS

| 2012/0158668 | A1* | 6/2012 | Tu ........................ G06Q 10/101 707/687 |
| 2015/0350064 | A1* | 12/2015 | Kano ...................... H04L 45/02 370/389 |
| 2022/0269531 | A1* | 8/2022 | Malvankar ............ G06F 9/4881 |
| 2022/0394793 | A1* | 12/2022 | Rakshit ................. H04W 12/55 |

* cited by examiner

Primary Examiner — Gil H. Lee
(74) Attorney, Agent, or Firm — Womble Bond Dickinson (US) LLP

(57) ABSTRACT

Systems, methods, and related technologies for classifying a device on a network are described. A method includes capturing device information corresponding to a device on a network. The method inputs unstructured crowdsourced data on the network into a machine learning model to produce structured crowdsourced data. The method classifies the device based on evaluating the device information with the structured crowdsourced data.

20 Claims, 7 Drawing Sheets

ENHANCED DEVICE CLASSIFICATION INCLUDING CROWDSOURCED CLASSIFICATIONS FOR INCREASED ACCURACY

CROSS-REFERENCE TO RELATED APPLICATIONS

This application is a continuation of U.S. patent application Ser. No. 18/148,951 ("the '951 application"), filed on Dec. 30, 2022 and entitled "ENHANCED DEVICE CLASSIFICATION INCLUDING CROWDSOURCED CLASSIFICATIONS FOR INCREASED ACCURACY," the entire contents of which are incorporated herein by reference. The '951 application claims priority from and the benefit of U.S. Provisional Patent Application No. 63/325,299, filed Mar. 30, 2022, the entire contents of which are incorporated herein by reference.

TECHNICAL FIELD

The present disclosure is related to network monitoring, and more particularly to an enhanced device classification that includes crowdsourced classifications for increased accuracy.

BACKGROUND

A computer network can include computing devices that communicate with each other over the computer network. The computing devices can be communicatively coupled to each other over physically wired, optical, or wireless radio frequency technology. A computer network can have a variety of network topologies with a variety of devices in different regions of the network. As technology advances, the number and variety of devices that communicate over computer networks are rapidly increasing.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

Figure 1:
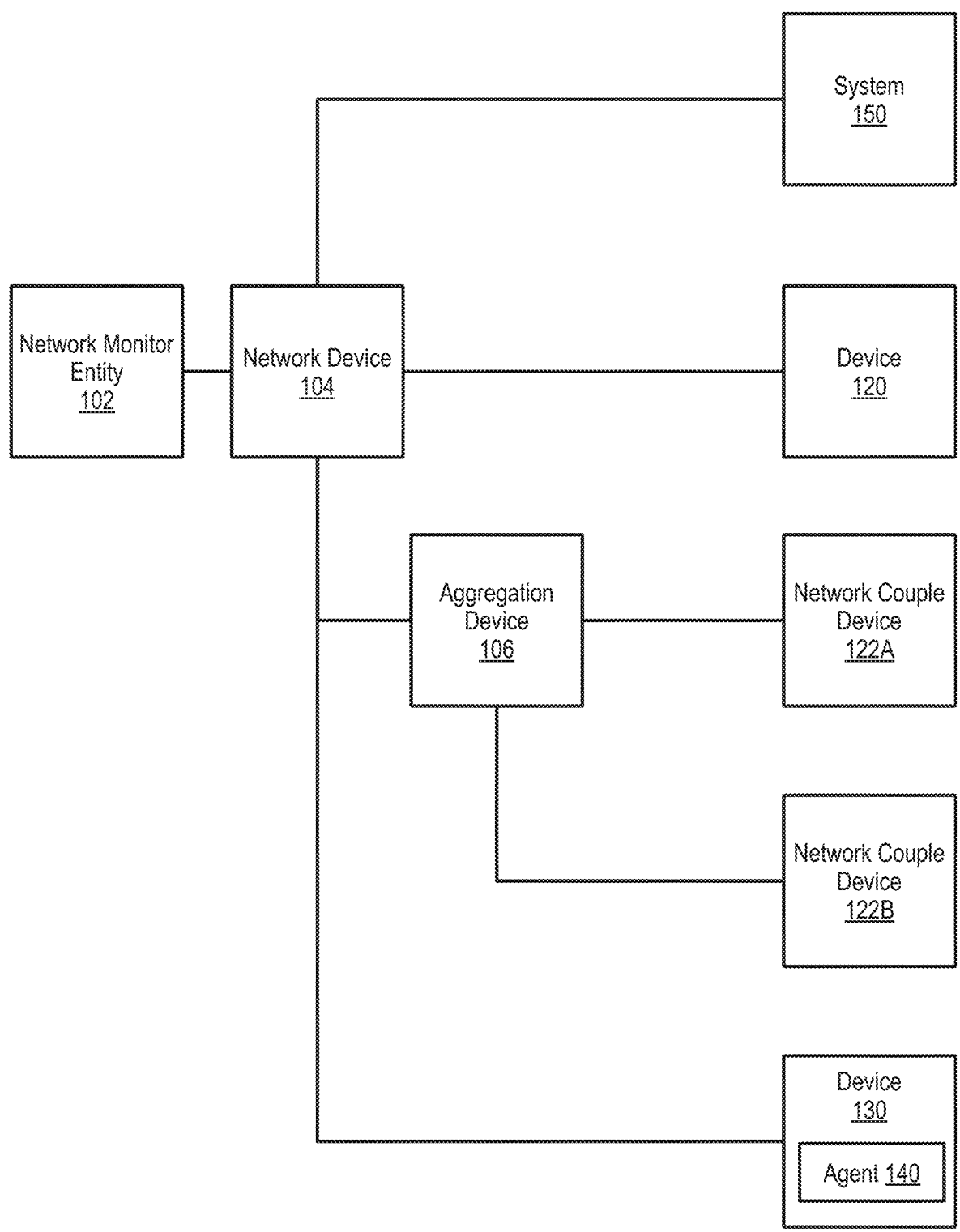
FIG. 1 is a block diagram illustrating an example of a communication network in accordance with some embodiments of the present disclosure.

As discussed above, as technology advances, the number and variety of devices that communicate over computer networks are rapidly increasing, all of which require classification to protect the computer network. In conventional systems, the classification of devices, in particular Internet of Things (IoT) and Operation Technology (OT) devices, represents a challenging problem in maintaining security and network access control (NAC) areas. As such, the conventional systems allow an attacker to use an unknown device to rapidly take control of network/computing resources and use for wasteful/deceptive purposes until the conventional systems classify the unknown device and remove the attacker from the network.

The present disclosure uses crowdsourced data to quickly classify unknown device fingerprints as they connect to a network and, in turn, quickly detect malicious clients and remove them from the network. The crowdsourced data includes information sent from/to a variety of devices, including newer technology devices, that enables the present disclosure to stay up-to-date with new devices as they are introduced into the marketplace, thereby decreasing classification time, increasing classification accuracy, and improving security and NAC areas. Accordingly, systems, methods, techniques, and related technologies are described herein in various implementations that includes a network monitor entity that may perform analysis on network traffic and obtain crowdsourced data. The network monitor entity may determine a classification of a device based on the network traffic and the crowdsourced data.

An entity or entities, for example, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP (Internet Protocol) address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN (Software-Defined Network) controller, virtual firewall, etc.) that are able to enforce access or other rules, ACLs (Access Control Lists), or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 is a block diagram illustrating an example of a communication network in accordance with some embodiments of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including capturing device information corresponding to a device on a network; inputting unstructured crowdsourced data on the network into a machine learning model to produce structured crowdsourced data; and classifying the device based on evaluating the device information with the structured crowdsourced data. In some embodiments, network monitor entity 102 can use local resources (e.g., processing, memory, data resources, or other resources), cloud resources, or a combination thereof for such an operation. In various embodiments, various libraries or an application programming interface (API) may be used to perform the operations of the network monitor entity 102.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC (Medial Access Control) address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP (Simple Network Management Protocol) information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After confirmation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122*a-b* and provide network access to network coupled devices 122*a-b*. Aggregation device 106 may further be configured to provide information (e.g., operating system, device software information, device software versions, device names, application present, running, or both, vulnerabilities, patch level, etc.) to network monitor entity 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor entity 102. It is appreciated that log information may be particularly reliable for stable network environments (e.g., where the types of devices on the network do not change often). The log information may include information of updates of software of network coupled devices 122*a-b*.

Figure 2:
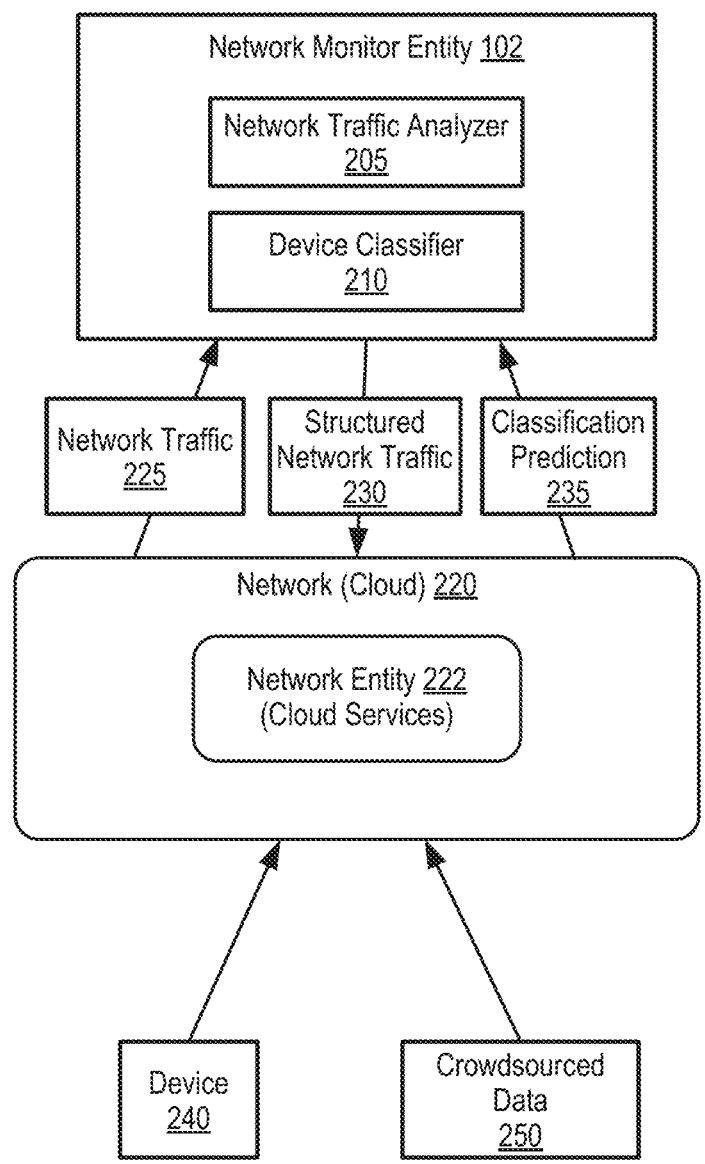
FIG. 2 is a block diagram illustrating an example of a network monitor entity classifying a device based on network traffic and crowdsourced data, according to some embodiments of the present disclosure.

FIG. 2 is a block diagram illustrating an example of a network monitor entity classifying a device based on network traffic and crowdsourced data, according to some embodiments of the present disclosure.

One or more of devices 240 may be communicatively coupled to a network 220. In some embodiments, network 220 may be a cloud-based system. Device 240 may include computer servers, IoT devices (e.g., a television, sensors, appliances, medical equipment, exercise equipment, or other IoT device), personal computers, databases, mobile phones, tablet computers, proprietary operational technology (OT), one or more entities, and more.

Network monitor entity 102 may include a device classifier 210 and network traffic analyzer 205. Network traffic analyzer 205 analyzes network traffic 225 (e.g., one or more traffic patterns of device 240) to produce structured network traffic 230. Structured network traffic 230 is formatted to identify the source address of device 240, packet information of device 240's traffic pattern, and a destination address of the data sent from device 240.

Network monitor entity 102 may be communicatively coupled to the network 220. Network monitor entity 102, in some embodiments, sends structured network traffic 230 to network entity 222 for analysis. Network entity 222 may be a cloud based service that includes feature engineering components and data analytics components to analyze structured network traffic with crowdsourced data 250 to generate classification prediction 235 (see FIG. 4 and corresponding text for further details). In some embodiments, the feature engineering component and data analytics component reside in network monitor entity 102 (see FIG. 5 and corresponding text for further details).

In some embodiments, device classifier 210 may perform analysis on network traffic 225, receive a classification prediction 235 generated by network entity 222 based on crowdsourced data 250, and determine a classification of a device 240 based on the network traffic 225 and the classification prediction 235. In some embodiments, classifying device 240 includes a variety of factors such as a network fingerprint, application context, and device type to be used along with crowdsourced data to increase confidence and accuracy of the device classification.

An agentless security appliance such as network monitor entity 102 may dynamically identify and evaluate network endpoints and applications when the security appliance is connected to a given network such as network 220. For each device 240, network monitor entity 102 determines a user, owner and operating system, as well as device configuration, software, services, patch state, and the presence of security agents. Network monitor entity 102 provides remediation, control and continuous monitoring of these devices.

Network monitor entity 102 performs these actions on networked devices such as, for example, corporate-issued, personally owned bring-your-own-device (BYOD) endpoints and non-traditional devices—without requiring software agents or previous device knowledge. Network monitor entity 102 deploys quickly into an existing environment (e.g., a network) and rarely requires infrastructure changes, upgrades, or endpoint reconfiguration.

Network monitor entity 102 may determine a device fingerprint based on a media access control (MAC) address, MAC address issuer, etc., which may be combined with network traffic analysis of packet headers including Multipurpose Internet Mail Extensions (MIME) type, protocol, port, application extension, optionally Uniform Resource Locators (URL), and Secure Sockets Layer (SSL) certificate issuer (if available).

In some embodiments, the packet engine of network monitor entity 102 or a programmatic system is used for traffic analysis. The network traffic 225 can be traffic between endpoints (from one endpoint to another) and/or broadcast traffic (from one endpoint to multiple devices or entities on the network). For example, network monitor entity 102 may analyze network traffic for a request of http://www.medical-MRI-manufacturer-site.com:80 and which has a header containing a MIME (Multipurpose Internet Mail Extensions) type (e.g., application/x-x509-ca-cert) and/or application extension (e.g., .apk, .exe, and .dmg), protocol (http), and port (80) and URL (medical-MRI-manufacturer.com) to determine a proposed classification of a device as an MRI device.

This analysis can also include the Secure Sockets Layer (SSL) certificate issuer to further determine the proposed classification. When the site sends the SSL certificate, who signed the application and who verified the application can be determined. The SSL certificate can be very useful in particular for operational technology (OT). For example, SCADA and medical devices may have certificates signed by a device manufacturer (e.g., General Electric (GE)) and by the Food and Drug Administration (FDA), respectively, which can be useful for classification.

Based on the above factors, network monitor entity 102 determines a proposed device classification. A repository with crowd sourced data (e.g., local to network monitor entity 102 or cloud based) can be used by network monitor entity 102 or in conjunction with a cloud based system to cross reference the proposed classification with validated crowd sourced data. If there is a match, then the device is classified according to the matching validated classification. If the proposed classification does not match, the proposed classification is submitted to the crowd sourced repository with the fingerprint data and the proposed classification for validation.

Proposed classifications in the crowd sourced repository can be validated based on a variety of factors including a source of submission and the number of times a device is classified with a high degree of confidence. A threshold can be used to determine when a number of matching proposed classifications can be considered a valid or validated classification. For example, the same proposed classification received from a number of hospitals (e.g., 10 different hospitals) can be used to determine that a proposed classification is valid. Proposed classifications could be validated by a company who makes device classifier 210 as well.

Embodiments of the present disclosure could also be used for identification of device spoofing because the device classification is based on a variety of factors making it very difficult to mimic many of them. For example, it will be very hard to mimic the SSL certificate.

Figure 3:
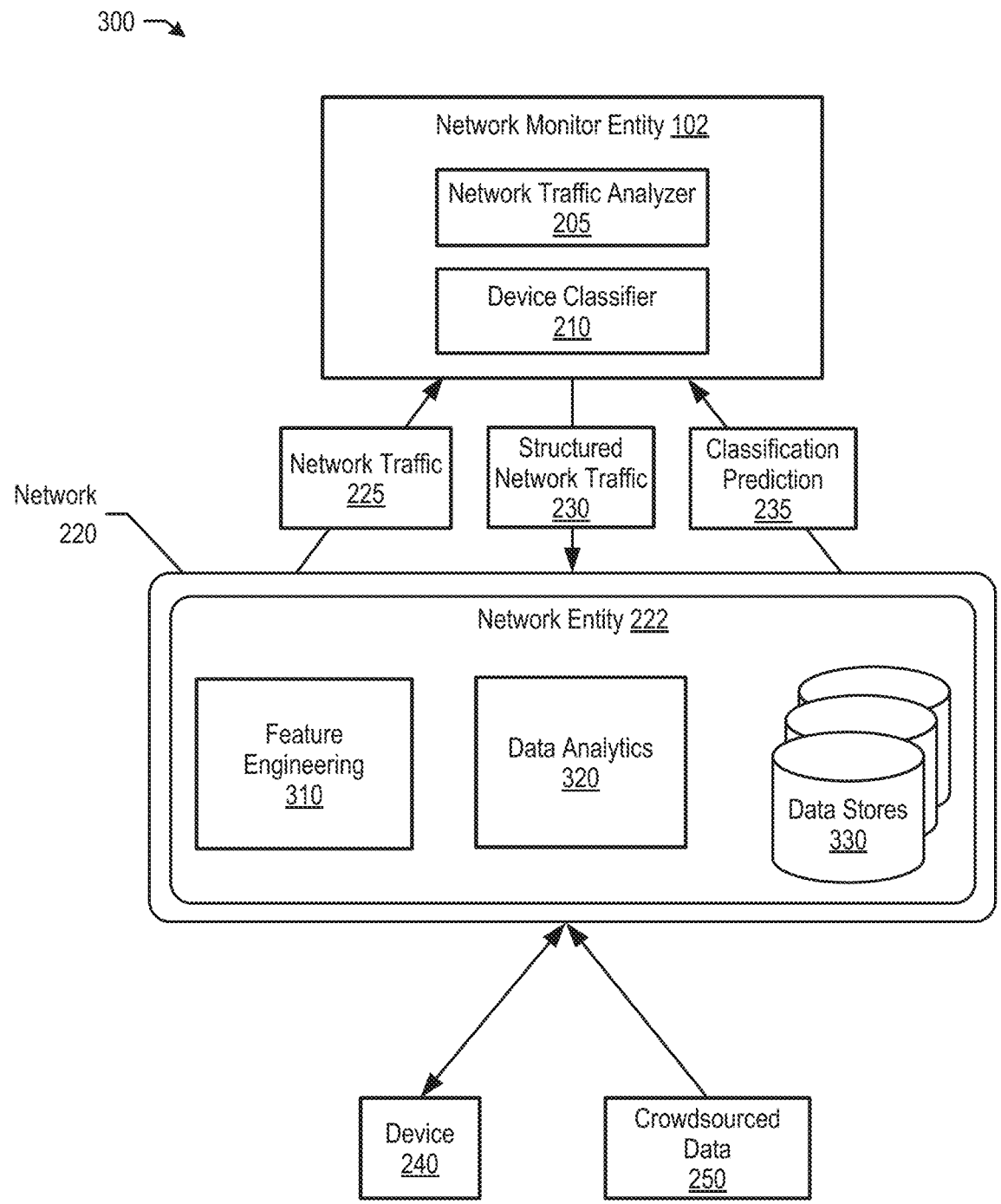
FIG. 3 is a block diagram illustrating an example of a network using feature engineering and data analytics to produce a device classification prediction, according to some embodiments of the present disclosure.

FIG. 3 is a block diagram illustrating an example of a network using feature engineering and data analytics to produce a device classification prediction, according to some embodiments of the present disclosure. System 300 shows that network entity 222 includes feature engineering 310, data analytics 320, and data stores 330. In some embodiments, feature engineering 310, data analytics 320, and data stores 330 are included in network monitor entity 102 (see FIG. 4 and corresponding text for further details).

In some embodiments, network entity 222 uses feature engineering 310 to transform crowdsourced data 250 into structured crowdsourced data, such as by using a trained machine learning model. Feature engineering 310 then stores the structured crowdsourced data in one of data stores 330. Crowdsourced data 250, which is unstructured, includes metadata and the structured crowdsourced data includes data types assigned by the trained machine learning model based on the metadata (e.g., see FIG. 5 and corresponding text for further details).

Network traffic analyzer 205 analyzes network traffic 225 (e.g., one or more traffic patterns of device 240) to produce structured network traffic 230. Structured network traffic 230 is formatted to identify the source address of device 240, packet information of device 240's traffic pattern, and a destination address of the data sent from device 240. Network entity 222 then stores structured network traffic 230 in one of data stores 330.

Data analytics 320 uses the structured crowdsourced data along with structured network traffic 230 stored in data stores 330 to generate classification prediction 235. Network entity 222 then provides classification prediction 235 to device classifier 210. In turn, device classifier 210 uses classification prediction 235 to classify device 240 (e.g., see FIG. 5 and corresponding text for further details).

Figure 4:
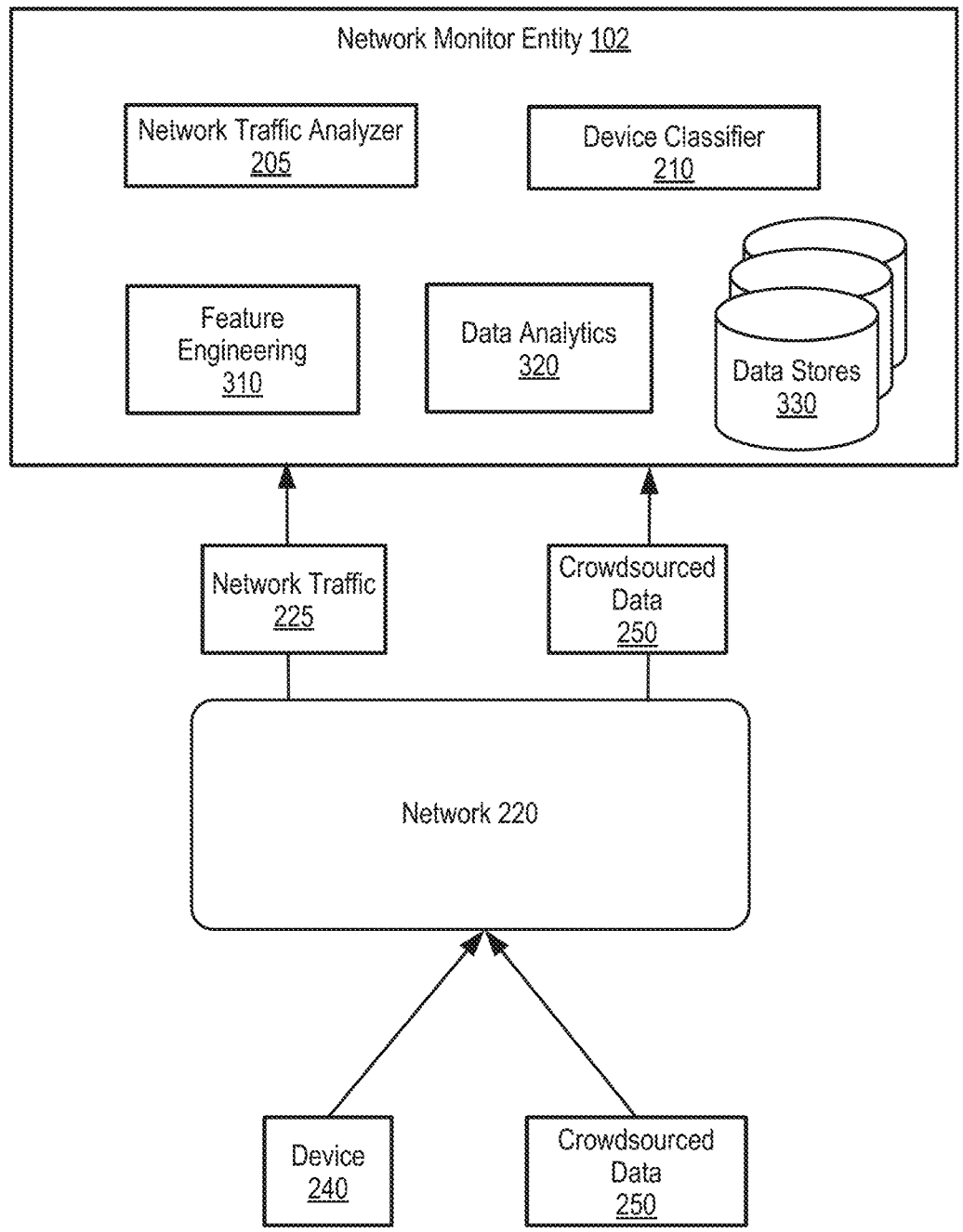
FIG. 4 is a block diagram illustrating an example of a network monitor entity using feature engineering and data analytics to produce a device classification prediction and classify a device, according to some embodiments of the present disclosure.

FIG. 4 is a block diagram illustrating an example of a network monitor entity using feature engineering and data analytics to produce a device classification prediction and classify a device, according to some embodiments of the present disclosure.

System 400 is similar to system 300 with the exception that feature engineering 310, data analytics 320, and data stores 330 are included in network monitor entity 102. In some embodiments, network monitor entity 102 receives network traffic 225 and crowdsourced data 250 from network 220 and performs the feature engineering operations and data analytics operations to generate a classification prediction and classify device 240 accordingly.

Figure 5:
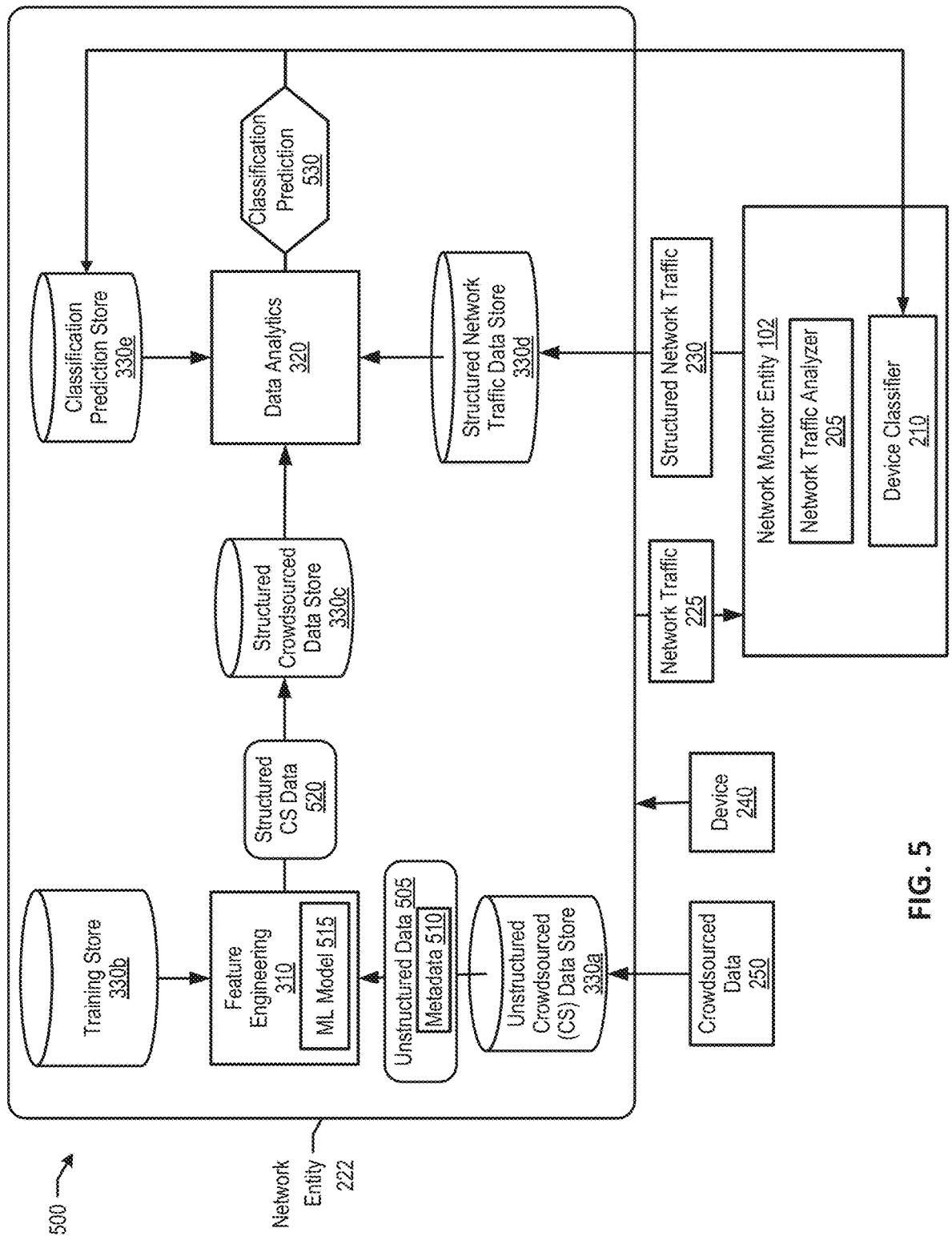
FIG. 5 is a block diagram illustrating a detailed example of using crowdsourced data to produce a device classification prediction, according to some embodiments of the present disclosure.

FIG. 5 is a block diagram illustrating a detailed example of using crowdsourced data to produce a device classification prediction, according to some embodiments of the present disclosure. System 500 shows a detailed representation of how network entity 222 generates a classification prediction based on crowdsourced data 250 and provides the classification prediction to network monitor entity 102. As discussed above and shown in FIG. 4, feature engineering 310 and data analytics 320 may be located in network monitor entity 102. In this embodiment, crowdsourced data 250 and network traffic 225 feed into network monitor entity 102, and then network monitor entity 102 performs operations similar to those in network entity 222 shown in FIG. 5.

In some embodiments, feature engineering 310 includes machine learning model 515. Machine learning model 515 is built from machine learning algorithms in feature engineering 310 based on sample data, known as "training data," to make predictions or decisions without being explicitly programmed. The process of training a machine learning model 515 involves providing a machine learning algorithm with the training data in training store 330b from which to learn, and the artifact created from the training process is the machine learning model 515. In supervised learning, the training data includes correct answers that are referred to as targets or target attributes, and the machine learning algorithm finds patterns in the training data that map input data attributes to the target attributes and outputs a machine learning model that captures the patterns. In unsupervised learning, the machine learning algorithms analyze and cluster unlabeled (no answer) datasets. These algorithms discover hidden patterns or data groupings without the need for human intervention to output the machine learning model.

Feature engineering 310 trains machine learning model 515 using training data stored in training store 330b. At times, machine learning model 515 is trained using supervised learning approaches, such as at the beginning of the training processes, and other times machine learning model 515 is trained using unsupervised training approaches. In some embodiments, the training data is a machine learning repository that includes datasets corresponding to network communications. In some embodiments, the training data is a customized dataset that includes historical data gathered from network entity 222 over time.

Crowdsourced data 250 is unstructured data (also referred to as schemaless data) that network entity 222 stores in unstructured crowdsourced data store 330a. The unstructured data is a collection of data that passes through network 220 and includes various types of metadata 510. Metadata 510 may include, for example, GPS location information, content information, indoor/outdoor location information, application information, etc. Once feature engineering 310 trains machine learning model 515, feature engineering 310 retrieves unstructured crowdsourced data 505 from unstructured crowdsource data store 330a. Feature engineering 310 uses machine learning model 515 to transform unstructured crowdsourced data 505 to structured crowdsourced data 520. Structured crowdsource data 520 is organized data with data types defined by machine learning model 515 based on metadata 510, which is stored in structured crowdsource data store 330c. Data analytics 320 uses structured crowdsourced data 520 for enhanced device classification prediction discussed below.

Network monitor entity 102 receives network traffic 225 from network 220. Network traffic 225 is a culmination of device data being sent over network 220 through multiple devices, which includes data sent from/to device 240. Network traffic analyzer 205 analyzes the network traffic 225 and produces structured network traffic 230. Structured network traffic 230 is organized data that includes data types identified by network traffic analyzer 205. Network monitor entity 102 sends structured network traffic 230 to network entity 222, which is stored in structured network traffic data store 330d.

Data analytics 320 accesses structured crowdsourced data from 330c and structured network traffic data from structured network traffic data store 330d, and performs analytics on a device fingerprint of device 240 to generate classification prediction 530. In some embodiments, data analytics 320 identifies a device type of a destination device for data sent from device 240 to assist in the analytics. For example, when device 240 uses an installed application to send data over network 220 to a destination device, data analytics 320 analyzes the packet information from the data and determines the application. For example, if the application is an MRI application for controlling an MRI machine, the MRI application may communicate with an update server of the maker of the MRI application. Data analytics 320 may use the communication to the update server of the maker of the MRI application to determine that device 240 is an MRI device. Data analytics 320 then determines that the application is installed on possible device types, such as through a look up table or structured crowdsourced data 520. Then, data analytics 320 determines a destination device type of the destination device to filter the possible device types to a list of possible source device types of device 240. Using the list of possible source device types and the structured crowdsourced data, data analytics 320 determines classification prediction 530.

Data analytics 320 stores classification prediction 530 in classification prediction store 330e for future retraining and iterative learning. Data analytics 320 sends classification prediction 530 to device classifier 210 in network monitor entity 102. Device classifier 210 uses classification prediction 530 to properly classify device 240.

Figure 6:
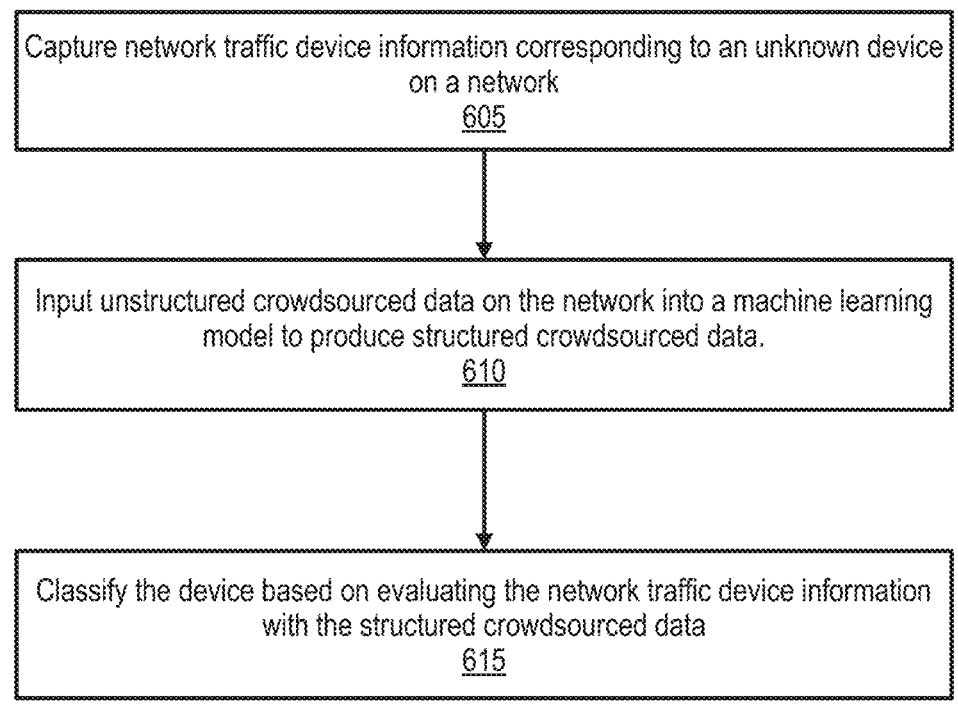
FIG. 6 is a flow diagram illustrating an example of device classification based on network traffic and crowdsourced data, according to some embodiments of the present disclosure.

FIG. 6 is a flow diagram illustrating an example of device classification based on network traffic and crowdsourced data, according to some embodiments of the present disclosure. Additional, fewer, or different operations may be performed in the method depending on the particular arrangement. In some embodiments, some or all operations of method 600 may be performed by one or more processors executing on one or more computing devices, systems, or servers (e.g., remote/networked servers or local servers). Each operation may be re-ordered, added, removed, or repeated. In some embodiments, method 600 may be performed by processing logic including hardware (e.g., circuitry, dedicated logic, programmable logic, a processor, a processing device, a central processing unit (CPU), a system-on-chip (SoC), etc.), software (e.g., instructions running/executing on a processor or processing device), firmware (e.g., microcode), or a combination thereof.

In some embodiments, the method 600 may include operation 605 of capturing network traffic device information corresponding to an unknown device on a network. The network traffic information may include traffic patterns of the unknown device (e.g., device 240). In some embodiments, the method 600 may include operation 610 of inputting unstructured crowdsourced data on the network into a machine learning model to produce structured crowdsourced data. In some embodiments, the unstructured crowdsourced data includes metadata and the structured crowdsourced data includes data types assigned by the machine learning model based on the metadata.

In some embodiments, the method 600 may include operation 615 of classifying the device based on evaluating the network traffic device information with the structured crowdsourced data. In some embodiments, the method analyzes the network traffic to identify a destination device that receives data sent from the unknown device. The method determines a destination device type of the destination device and evaluates the destination device type with the data types in the crowdsourced data to refine the unknown device type.

Figure 7:
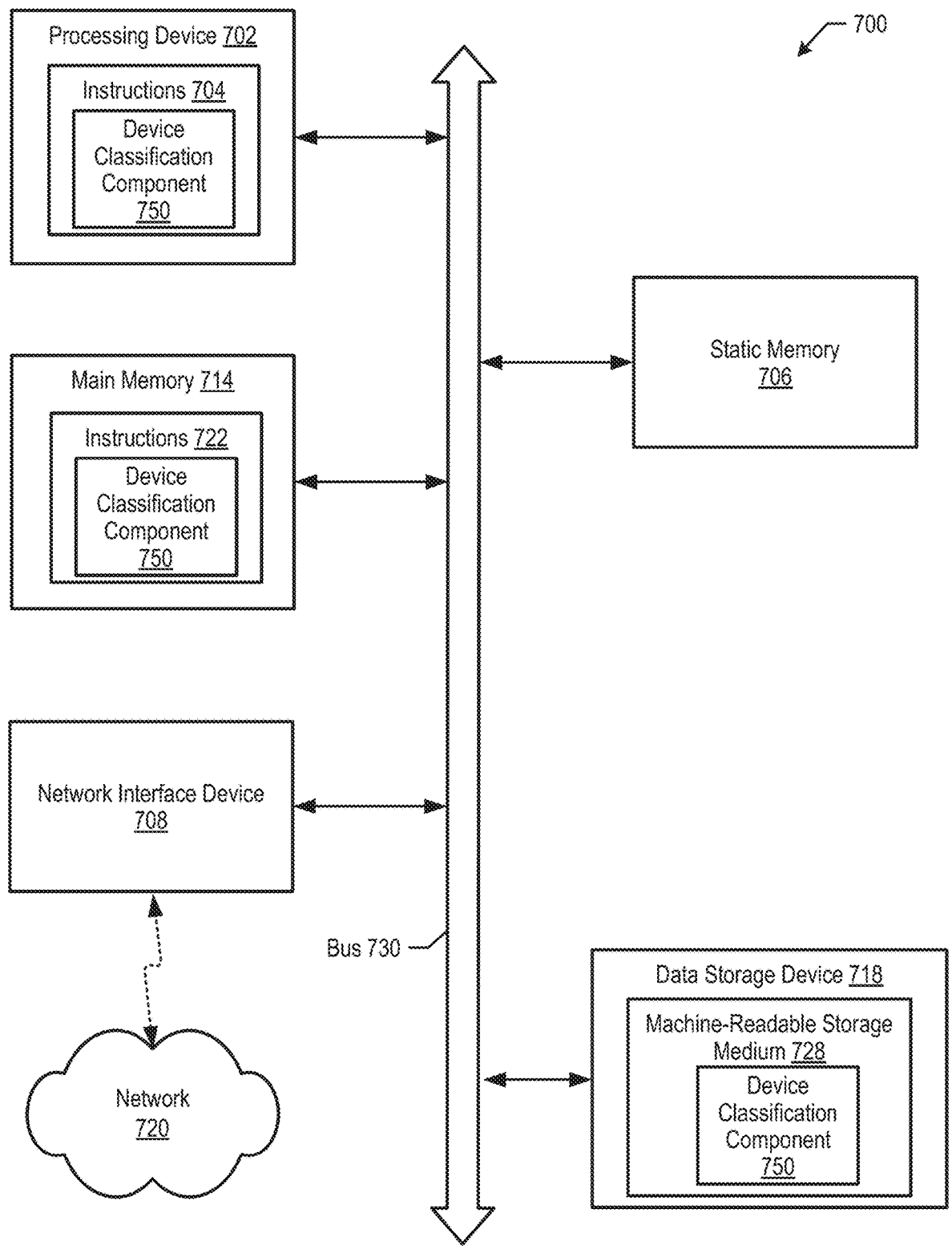
FIG. 7 is a block diagram illustrating an example computer system, in accordance with one some embodiments of the present disclosure.

FIG. 7 is a block diagram illustrating an example computer system 700, in accordance with some embodiments of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 700 may be representative of a server, such as network monitor entity 102 or 102 that runs a device classification component 750 to classify one or more devices based on network traffic and crowdsourced data, as described herein.

The exemplary computer system 700 includes a processing device 702, a main memory 714 (e.g., read-only memory (ROM), flash memory, dynamic random access memory (DRAM)), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 704 which may include device classification component 750, for performing the operations and blocks discussed herein.

The data storage device 718 may include a machine-readable storage medium 728, on which is stored one or more set of instructions (device classification component 750 (e.g., software)) embodying any one or more of the methodologies of operations described herein, including instructions to cause the processing device 702 to execute a device classification component 750. The device classification component 750 instructions may also reside, completely or at least partially, within the main memory 714 or within the processing device 702 during execution thereof by the computer system 700; the main memory 714 and the processing device 702 also constituting machine-readable storage media. The device classification component 750 instructions may further be transmitted or received over a network 720 via the network interface device 708.

The machine-readable storage medium 728 may also be used to store instructions to perform a method for an enhanced device classification that includes crowdsourced classifications for increased accuracy, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A method, comprising:
    analyzing network traffic on a network to identify a destination device that receives data sent from a device, wherein the network traffic comprises device information of the device;
    inputting, by a processing device, unstructured crowdsourced data on the network into a machine learning model to produce structured crowdsourced data, wherein the unstructured crowdsourced data comprises metadata and the structured crowdsourced data comprises data types assigned by the machine learning model based on the metadata;
    producing a classification prediction based on the structured crowdsourced data and the device information; and
    training, based on the classification prediction and the device information, a model to classify devices.

2. The method of claim 1, wherein training the model comprises retraining the model based on the classification prediction.

3. The method of claim 1, wherein the device information comprises location information of the device.

4. The method of claim 1, further comprising:
    using the model to produce a subsequent classification prediction for a subsequent device.

5. The method of claim 1, wherein producing the classification prediction comprises performing analytics on a device fingerprint of the device to generate the classification prediction.

6. The method of claim 1, wherein the device corresponds to a malicious client.

7. The method of claim 1, further comprising:
    capturing the device information corresponding to the device on the network.

8. A system comprising:
    a memory; and
    a processing device, operatively coupled to the memory, to:
        analyze network traffic on a network to identify a destination device that receives data sent from a device, wherein the network traffic comprises device information of the device;
        input unstructured crowdsourced data on the network into a machine learning model to produce structured crowdsourced data, wherein the unstructured crowdsourced data comprises metadata and the structured crowdsourced data comprises data types assigned by the machine learning model based on the metadata;
        produce a classification prediction based on the structured crowdsourced data and the device information; and
        train, based on the classification prediction and the device information, a model to classify devices.

9. The system of claim 8, wherein to train the model, the processing device is to retrain the model based on the classification prediction.

10. The system of claim 8, wherein the device information comprises location information of the device.

11. The system of claim 8, wherein the processing device is further to:
    use the model to produce a subsequent classification prediction for a subsequent device.

12. The system of claim 8, wherein to produce the classification prediction, the processing device is to perform analytics on a device fingerprint of the device to generate the classification prediction.

13. The system of claim 8, wherein the device corresponds to a malicious client.

14. The system of claim 8, wherein the processing device is further to:
    capture the device information corresponding to the device on the network.

15. A non-transitory computer readable medium having instructions encoded thereon that, when executed by a processing device, cause the processing device to:
    analyze network traffic on a network to identify a destination device that receives data sent from a device, wherein the network traffic comprises device information of the device;
    input, by the processing device, unstructured crowdsourced data on the network into a machine learning model to produce structured crowdsourced data, wherein the unstructured crowdsourced data comprises metadata and the structured crowdsourced data comprises data types assigned by the machine learning model based on the metadata;
    produce a classification prediction based on the structured crowdsourced data and the device information; and
    train, based on the classification prediction and the device information, a model to classify devices.

16. The non-transitory computer readable medium of claim 15, wherein to train the model, the instructions, when executed by the processing device, cause the processing device to retrain the model based on the classification prediction.

17. The non-transitory computer readable medium of claim 15, wherein the device information comprises location information of the device.

18. The non-transitory computer readable medium of claim 15, wherein the instructions, when executed by the processing device, further cause the processing device to:
    use the model to produce a subsequent classification prediction for a subsequent device.

19. The non-transitory computer readable medium of claim 15, wherein to produce the classification prediction, the instructions, when executed by the processing device, cause the processing device to perform analytics on a device fingerprint of the device to generate the classification prediction.

20. The non-transitory computer readable medium of claim 15, wherein the device corresponds to a malicious client.

* * * * *